United States Patent [19]
Luttmer

[11] Patent Number: 5,528,733
[45] Date of Patent: Jun. 18, 1996

[54] APPARATUS FOR RASTERIZING IMAGE DATA IN OUTLINE FORM

[75] Inventor: Maurice L. M. Luttmer, Venlo, Netherlands

[73] Assignee: Oce-Nederland B.V., Netherlands

[21] Appl. No.: 994,993

[22] Filed: Dec. 22, 1992

[30] Foreign Application Priority Data

Dec. 23, 1991 [NL] Netherlands .................. 9102165

[51] Int. Cl.⁶ .................................................. G06K 15/00
[52] U.S. Cl. ............................................ 395/107; 358/530
[58] Field of Search ........................... 395/107, 116, 395/115, 114, 109, 162; 358/530

[56] References Cited

U.S. PATENT DOCUMENTS

| | | | |
|---|---|---|---|
| 4,965,749 | 10/1990 | Straayer | 395/107 |
| 5,146,547 | 9/1992 | Beck et al. | 395/116 |
| 5,255,351 | 10/1993 | Takanashi et al. | 395/109 |
| 5,261,046 | 11/1993 | Shope et al. | 395/162 |
| 5,265,196 | 11/1993 | Haneda | 395/109 |
| 5,335,316 | 8/1994 | Toyokura | 395/115 |
| 5,361,330 | 11/1994 | Fujisaki et al. | 395/107 |

FOREIGN PATENT DOCUMENTS

| | | |
|---|---|---|
| 0406956 | 1/1991 | European Pat. Off. . |
| WO9107843 | 5/1991 | WIPO . |

OTHER PUBLICATIONS

IBM Technical Disclosure Bulletin, vol. 20, No. 4, Sep., 1977, New York, pp. 1578–1580 by M. Brandon: "Modified Algorithm For Raster Scan CRT Display".

Primary Examiner—Raymond J. Bayerl
Assistant Examiner—Steven P. Sax

[57] ABSTRACT

Image data in outline form is automatically converted into a bit map for a reproduction means, using the half bitting effect for more accurate positioning of image boundaries. The pixels are divided up into strips each associated with an effective boundary line position and a half bit pattern by means of which the effective boundary line position can be reached. These strips are so selected that a point within the strip is situated closer to the associated effective boundary line position than to the pixel boundary or to another effective boundary line position. For pixels which are intersected by the outline, a check is made as to whether the outline extends entirely within such a strip and the pixels which satisfy this condition are given a value in accordance with the associated half bit pattern if they are flanked by at least one other pixel satisfying the same condition.

32 Claims, 7 Drawing Sheets

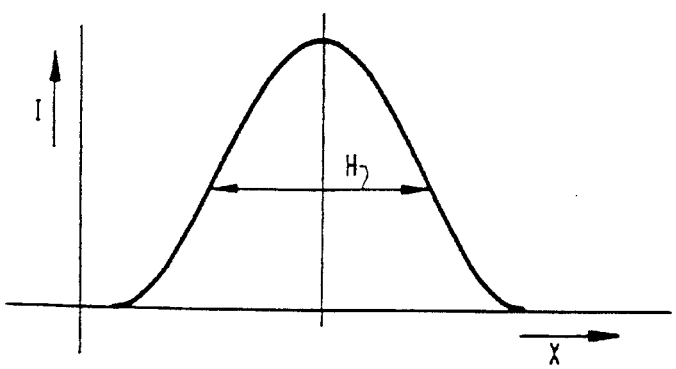
FIG. 3
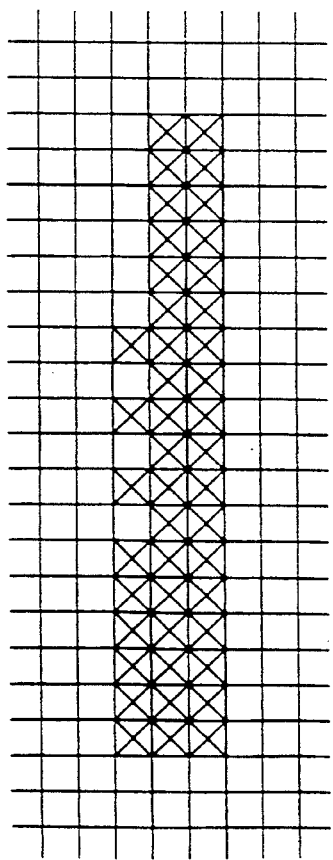 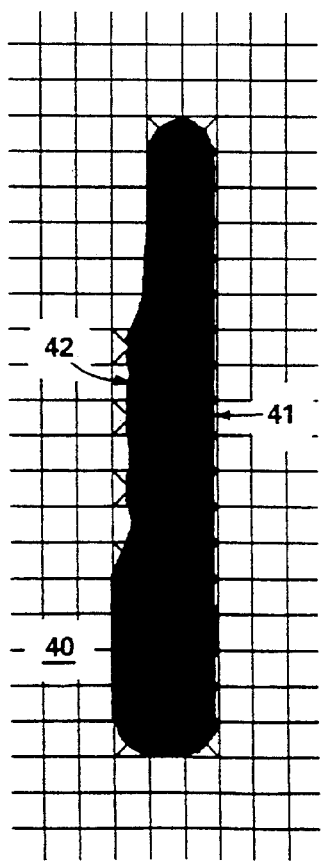 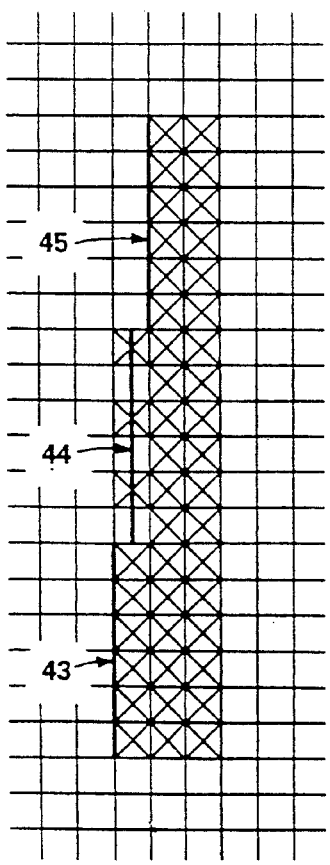
FIG. 4A    FIG. 4B    FIG. 4C

APPARATUS FOR RASTERIZING IMAGE DATA IN OUTLINE FORM

BACKGROUND OF THE INVENTION

1. Field of the Invention

The present invention relates to an apparatus for converting digital image data into a visible image, and more specifically, to an apparatus for rasterizing image data comprising outlines of image portions.

2. Discussion of the Related Art

An apparatus for the conversion of digital image data into a visible image is used in reproduction means, such as printers, In such cases the digital image data is often available in the form of outlines which form the edges of image portions which are to be reproduced black. Usually, however, a reproducing means form its visible image by placing an imaginary raster of image elements, i.e., pixels, over the image and coloring some of the pixels black and the remainder white, Converting outline data into a pattern of black and white pixels is termed rasterizing. The pixel raster is usually orthogonal and thus has two major directions perpendicular to one another.

On rasterizing, pixels which are situated entirely within an image portion are assigned a binary value, e.g. 1, while the pixels which are situated entirely outside an image portion are given the other binary value, in this case 0. Pixels intersected by the outline of an image portion are given a value which, when the rasterized image data is printed in a printer, is as close as possible to the configuration of that outline. An apparatus of this kind is known from European patent application EP-A 0 406 956. In the known apparatus, the area fraction situated within an image portion is determined for pixels which are situated on an outline, and the area fraction is converted, by rounding off, to a binary value (0 or 1) for each following pixel extending along the outline. The rounding-off error in this case, or at least a number based on the rounding-off error, is passed on to the next pixel on the outline, where it is counted in the area fraction of that pixel before a binary value is calculated for that pixel by rounding off. As a result, a tooth structure forms at places where the outline extends approximately parallel to one of the two major directions of the pixel raster and intersects a number of contiguous pixels. The pixels intersected by the outline alternately have the values 0 and 1, while they are flanked on one side by pixels all having the value 0 and on the other side by pixels all having the value 1. The flanking pixels, of course, are situated entirely on the inside and outside respectively of the image portion.

When a pixel pattern calculated in this way is reproduced by a printer or a display, the referenced tooth structure is not visible in a number of cases. In many laser printers, the light spot by means of which the image is formed extends over a number of pixels and thus flattens out details of the order of magnitude of one pixel. This flattening effect results in the boundary line shifting somewhat on the print and ending up, for example, about midway between the pixels situated on the outline. In other printers or in displays which accurately reproduce the pixels, the visibility of the separate pixels is still always dependent upon the resolution of the pixel raster. If this is greater than approximately 20 pixels per mm, separate pixels can no longer be perceived as such with the naked eye and the tooth structure referred to also simply results in a shift of the perceived image boundary. By using this effect, it is possible, with the aid of different tooth structures, to position a reproduced boundary line more accurately than in steps of the size of one pixel. This known technique is termed "half bitting".

A disadvantage of the known apparatus is that the rasterization of an image follows the outlines and thus moves in arbitrary directions over the image. As a result, the rasterized image data becomes available in accordance with the pattern of the outlines, while when the data is used it is preferable to offer the data in the form of consecutive parallel image lines in one of the two major directions of the pixel raster. This is associated with the further use of the rasterized image data, such as by direct conversion thereof to control signals for a reproducing system, which usually operates image line-wise, for storage thereof in a memory. In the latter case, the binary pixel values are preferably stored in consecutive memory words of 32 bits, for example, for each image line, each bit containing one pixel value. The storage of the pixel values is, of course, most rapid if the pixel values are also supplied in the form of image lines. It is therefore desirable for the rasterization apparatus to deliver the binary pixel values image line-by-image line.

SUMMARY OF THE INVENTION

Therefore, it is an object of the present invention to provide an apparatus for converting digital image data into a visible image by rasterizing image data, which will overcome the above-noted disadvantages.

A further object of the present invention is to provide an apparatus for rasterizing image data representing outlines of image portions.

It is a further object of the present invention to provide a rasterization apparatus which will deliver binary pixel values image line-by-image line for rapid storage of rasterized image data or direct conversion thereof to control signals for reproduction.

Yet, a further object of the present invention is to provide an apparatus for reproducing digital image data equipped with an apparatus for rasterizing data.

The foregoing object and others are accomplished in accordance with the present invention, generally speaking, by providing an apparatus for rasterizing image data comprised of outlines of image portions, such an apparatus including means for calculating, on the basis of the image data, the configuration of the outlines and projecting the outlines on a raster of pixels and means for assigning a binary value to the pixels in dependence on their position with respect to the outlines, using a half bitting effect. The apparatus includes the features of (1) a memory for storing therein at least one group of data, comprising a half bit pattern, associated with an effective boundary line position with respect to the pixel raster, and 2) an identification means for identifying straight series, extending in a major direction of the pixel raster, of contiguous pixels which are intersected by one and the same outline and within which the outline is situated closer to the effective boundary line position associated with a half bit pattern stored in the memory than to a pixel edge, which identification means is connected to the means for assigning a binary value to the pixels in order to give commands, the means for assigning a binary value to the pixels being adapted to assign, on the command from the identification means, to the pixels of such an identified series values, in accordance with the half bit pattern associated with the relevant effective boundary line position and stored in the memory.

In this apparatus, therefore, a search is in fact made for those areas where an outline extends substantially parallel to one of the major directions of the raster and also intersects the pixels so that the boundary of a (black) image portion cannot be reproduced on the print in the required location. In such areas the use of half bitting can be considered in order to position the boundary more accurately. Since half bitting enables only a restricted number of new positions to be reached, a check must be made as to whether the new positions give a better approach to the required location. A half bit pattern consisting of black and white pixels alternately, for example, delivers an effective boundary line position which is situated midway along the pixels. If the required location of the outline is thus closer to the middle of the pixels in the series than to the sides, half bitting is preferred with that pattern, but otherwise it is not so preferred. In this way, half bitting patterns are generated at the correct positions without it being necessary first to assign a value to all pixels on the outlines before the rasterized image data can be delivered to the reproducing means. In the apparatus according to the present invention, of course, it is no longer necessary to transmit a value from one pixel to the next.

The half bit patterns used are periodic patterns. They can therefore readily be stored in the memory in the form of a small computer program which cyclically generates the pixel values. It is also possible to store a complete pattern in the length of the maximum dimension of the image and then draw the pixel values therefrom e.g. in correspondence with the position in the pixel raster.

According to a first embodiment, the apparatus includes identification means provided with means for identifying a series, extending in a given major direction of the pixel raster, of contiguous pixels within which an outline extends entirely in the same half bit strip, a half bit strip being a part of a pixel which is bounded by two lines which extend parallel to a given major direction of the pixel raster and intersect the pixel, each half bit strip being associated with a half bit pattern stored in the memory. In this embodiment, these strips are so selected that a position within a half bit strip is closer to the effective boundary line position associated with that strip than to another effective boundary line position (if present) or to a pixel boundary. Thus, the (only) half bit strip of the already described half bit pattern of alternate white and black pixels will be situated between ¼ and ¾ of the pixel width. For practical reasons, such as the properties of the processing portion of the reproducing means, other limitations may also apply to the half bit strip.

In principle, a half bit pattern may also be placed in a series of pixels shorter than the repetition period of the pattern, even if incompletely. The best result, however, is obtained if a half bit is placed only in a series of pixels which is at least equal in length to the repetition period thereof.

To this end, in another embodiment, the identification means is provided with means for determining the length of an identified series and to test this by reference to a minimum length stored in the memory in combination with the half bit pattern associated with the relevant half bit strip. The identification means outputs a command, only when the length of such an identified series is at least equal to the minimum length, in order to assign values in accordance with the relevant half bit pattern to the pixels of the series.

According to another embodiment, the apparatus according to the present invention includes identification means provided with means whereby a pixel intersected by an outline is checked as to whether the outline is situated completely within a half bit strip of the pixel and whether the same outline extends entirely in the same half bit strip of at least one adjoining pixel in the direction of the outline, a half bit strip being part of a pixel which is bounded by two lines extending parallel to a given major direction of the pixel raster and intersecting the pixel, each half bit strip being associated with a half bit pattern stored in the memory. In this way, a series of pixels under consideration for half bitting is filled in, pixel by pixel, in accordance with the half bit pattern, and this is in contrast to the above-described first embodiment in which first the entire series is identified and is then filled in in one operation. If required, this filling in, pixel by pixel, can be subjected to a supplementary requirement that first a minimum number of adjoining pixels must be signalled which satisfy the criterion for half bitting.

The present invention is adaptable to an apparatus for reproducing digital image data equipped with a rasterization apparatus according to the invention, such as a printer or a display.

BRIEF DESCRIPTION OF THE DRAWINGS

The invention will now be explained in detail with reference to the drawings.

FIG. 3 shows the intensity distribution of the light spot on the photoconductive belt in the laser printer, FIG. 4A shows part of a bit map, FIG. 4B shows the print result using the bit map of FIG. 4A, FIG. 4C shows the configuration of effective boundary lines associated with the pixel pattern in this potion of the bit map.

DETAILED DISCUSSION OF THE INVENTION

Figure 1:
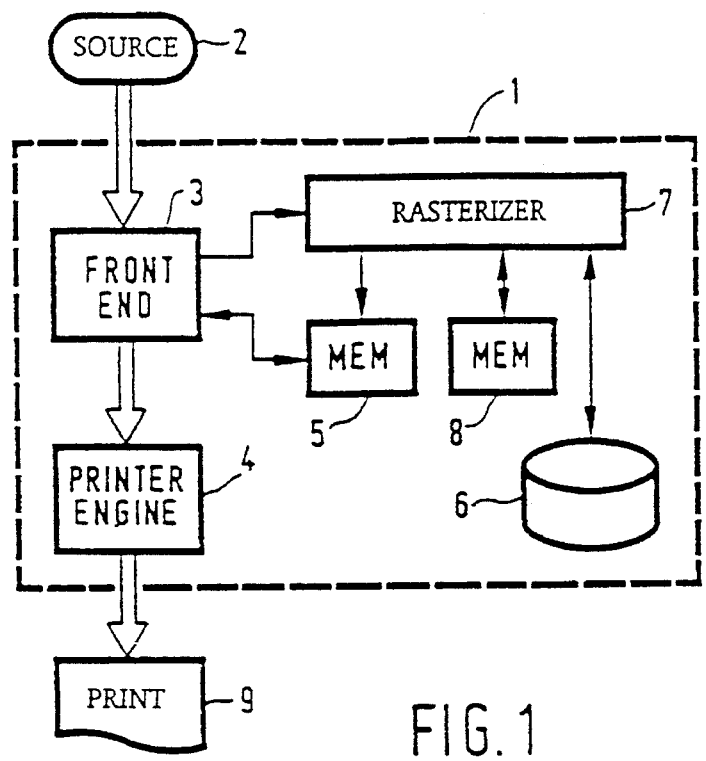
FIG. 1 is a diagram of an apparatus for reproducing digital image information according to the invention, FIG. 2 diagrammatically illustrates the printer engine of a laser printer for use in the apparatus of the present invention.

FIG. 1 shows the general layout of a printer 1 according to the present invention for printing information in digital form, for example containing the text of a document. The printer 1 comprises a front end 3 connected to a printer engine 4, to a memory 5 and to a rasterizer 7. The rasterizer 7 is in turn connected to the memory 5 and also to a mass memory 6, e.g. a hard disk, and a working memory 8. An external signal source 2, for example a secretarial workstation, is connected to the front end 3 of the printer and delivers thereto digital data in which the text and layout of the document is coded in a page description language (PDL). The front end 3 interprets the data, converts the data into a bit map, a raster image of white and black pixels, and transmits this to the printer engine 4, in which the bit map data is used to control a writing process, delivering a readable print on paper 9.

In compiling the bit map the front end 3 makes use of sub-bit maps stored in the memory 5, which contain the images of individual characters. Such sub-bit maps are placed next to one another in the correct sequence to form a line of text. The character images stored in the memory 5 belong to a given font (the complete collection of characters in a given letter type, point size and style), and a number of fonts is stored in bit map form in the memory 5 beforehand so as to be readily available. These fonts in bit map form are formed by the rasterizer 7 on the basis of data from the mass memory 6. This mass memory contains a much larger number of fonts in outline form, i.e. mathematically defined line portions which describe the edges of the parts of a character which are to be reproduced in black. If, during the making of a bit map, a font is asked for by the front end 3 and is not available in memory 5, rasterizer 7 brings this font out of the mass memory 6 on the command of the front end 3, converts it into bit map form and places it in memory 5 so that it can be used by the front end 3.

In order to make fonts in bit map form from the fonts in outline form, an outline is imaged in the rasterizer on the pixel raster and the pixels are assigned a value (white or black) in accordance with their position with respect to the outline, black inside the outline and white outside. Pixels which are intersected by the outline require extra attention because they result in distortion of the image. It is not possible to make a pixel partially black, and hence the effective image boundary will follow the pixel boundary and not the outline. The image printed by the printer engine 4, however, is also not exactly equal to the bit map image, as a result of imperfections in the printing process. These imperfections can at least partially compensate the above-mentioned distortions, given skillful use.

Figure 2:
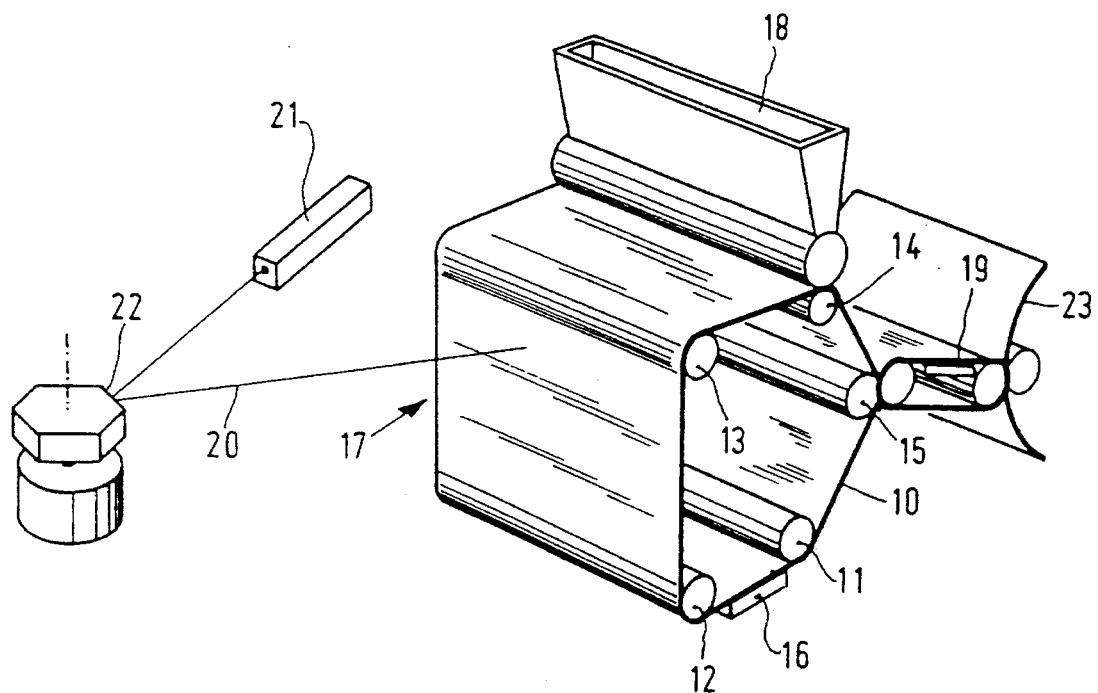

FIG. 2 diagrammatically illustrates the printer engine 4 of the printer, in this case a laser printer, and the operation will be explained by reference thereto. A belt 10 of photoconductive material is trained about a number of rollers 11, 12, 13, 14 and 15 and transported about these rollers past a number of processing stations 16, 17, 18 and 19. In charging at station 16 the belt 10 is provided with a surface charge which is then selectively exposed in the exposure station 17 by exposing the surface of the belt to a beam of light 20 in accordance with the raster pattern in the image information. This is done by moving a beam of light 20 from a laser 21 over the belt surface by means of a rotating mirror 22 in a transverse direction with respect to the direction of transport of the belt 10 and by simultaneously modulating the light. A raster pattern of charged and discharged locations is thus formed on the belt surface. This pattern is now developed with colored powder, or toner, at the developing station 18, the charged locations being provided with toner. This process is generally known from electrophotography and will not be described in detail here. The toner image formed on the belt 10 is then transferred in a transfer station 19 to an image support 23, thus completing the printing process.

FIG. 3 shows the intensity distribution of the light spot on the surface of the photoconductive belt 10. As a function of the location x, the intensity (I) has a substantially Gaussian curve with a half-value width H, which is of the same order of magnitude as the length of a pixel. The light spot thus falls partially, and with lower intensity, over neighboring pixels. The quantity of light falling on a pixel is accordingly the sum of contributions from the pixel itself and from the neighboring pixels. With this form the exposure function acts as a low-pass filter on the laser control signal.

FIG. 4A shows parts of a pixel raster containing pixels which must be exposed in accordance with the image data by the laser beam (white) and pixels which are not to be exposed (provided with an X). In the middle part of FIG. 4A, a half bit pattern is present on the boundary line between the area to be exposed and the area which is not to be exposed, pixels which alternately are exposed and not exposed. When the charged belt surface is exposed in accordance with the pattern of FIG. 4A by means of the light spot shown in FIG. 3, the charge pattern formed on the belt has a gradual transition between the discharged area (40) and the charged area (41), the toothed shape of the boundary line being difficult to recognize in the bottom half of FIG. 4A because of the flattening effect on the large light spot. The developing station then covers the belt with toner powder at the locations where the electric field above the belt is greater than a critical value applicable to the system. This yields a visible image, as shown in FIG. 4B, with a slightly corrugated boundary line 42 in the middle part, the line being situated on average midway along the pixels. Since the pixels are very small in most printers, the boundary line 42 appears straight when viewed normally.

To process the outline data to pixel values it is then acceptable to use straight "effective" boundary lines 43, 44 and 45, which at contiguous boundary pixels run equally to the boundary lines between pixels which are to be exposed and those which are not to be exposed and, at a boundary with a half bit pixel pattern, run midway through the half bit pixels. This is shown in FIG. 4C. Effective boundary lines of this kind are always taken as the basis in the following description.

By using the half bit effect it is thus possible to position the boundary between a black and white image part on half pixels accurately. With other half bit patterns consisting of three pixels of which one or two respectively are exposed, the boundary can be placed at ⅔ or ⅓ respectively of the pixel width so that it is possible to position the boundary with an accuracy of ⅓ pixel. Even larger half bit patterns are possible in principle, provided the area of the light spot is large enough with respect to the dimensions of the pattern.

An automatic half bitting procedure according to the instant invention will now be described in the case of a half bit pattern with a period of two pixels formed by alternate white and black pixels. This pattern can be used when the outline defined by the image data extends over at least two whole pixels (the period of the pattern), closer to the middle of the pixels than to their edge. In the conventional square raster of pixels there are two cases, one wherein the outline extends substantially parallel to one major direction of the pixel raster or one wherein the outline extends substantially parallel to the other major direction. These major directions coincide with the direction of displacement of the light spot over the photoconductive belt, (1) the "scanning direction", and (2) the direction perpendicular thereto, the "sub-scanning direction".

The procedure for assigning binary values to pixels extends in two parts. In the first part, the image data is so pre-processed that the pixels can be provided with binary values in the second part, scan line-by-scan line.

Figure 5:
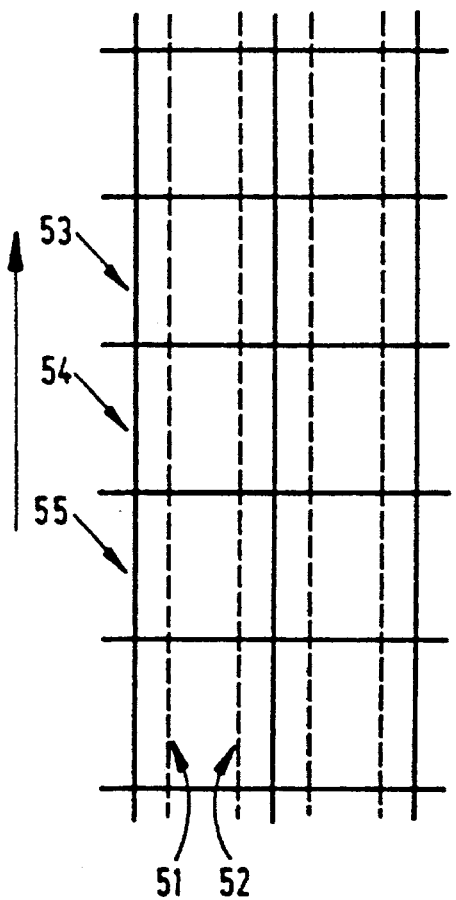
FIG. 5 shows part of a pixel raster.

In the first part, each outline described in the image data is followed and a management system is compiled in the working memory 8 (FIG. 1) in respect of all the locations where the outline comes into contact with a scan line, either by the outline intersecting the scan line or by a bend in the outline partially overlapping the scan line. See FIG. 6 where the outline of image portion 70 partially overlaps the scan line 61 and intersects the scan line 65 at two places. It is also determined here whether the outline in a pixel is closer to the middle of the pixel than to the edge, in which case the pixel is considered in principle for half bitting. For this purpose use is made of auxiliary lines which extend parallel to the scan direction and divide the pixels into three strips having a width of ¼, ½ and ¼ pixel width, respectively. These values are an example. Selection of other values is within the ordinary level of skill, i.e., such values will be different in practice as a result of system properties of the printer. The auxiliary lines (51, 52) are drawn in FIG. 5 in a row of pixels 53, 54, 55.

Figure 6:
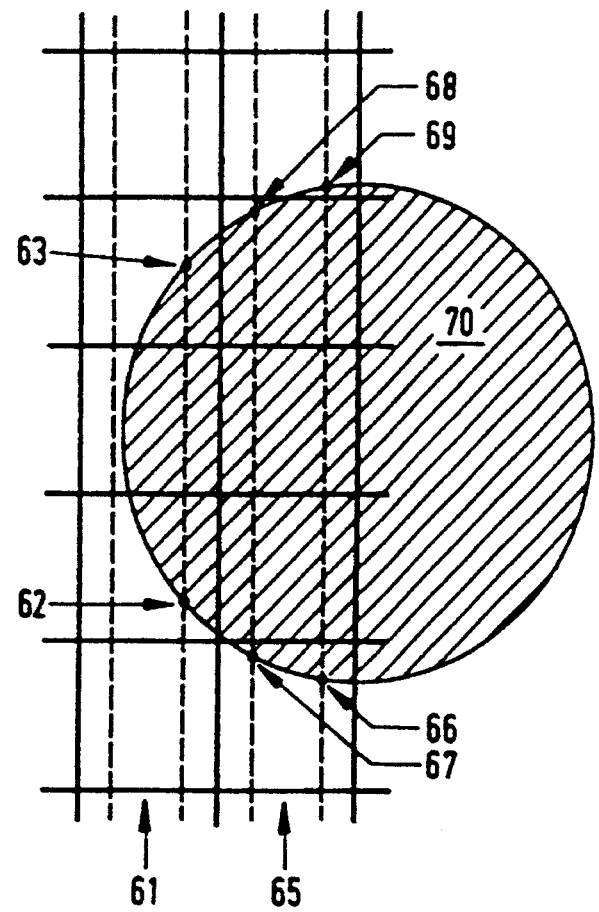
FIG. 6 shows two scan lines with an image portion superposed thereon.

Since all the outlines are closed curves which do not intersect one another and are situated entirely within the area for rasterizing, a point of intersection of an outline with an auxiliary line, where the outline enters the area between the auxiliary lines of a scan line, is always followed by a point of intersection where the outline leaves the area again. In these conditions the points of intersection may both be situated on the same auxiliary line or on different lines. An example of this is shown in FIG. 6. In the first case, the scan line 61 extends outside the image portion 70 both in front of and after the points of intersection 62 and 63. In the second case the scan line 65 extends outside the image portion 70 in front of the points of intersection (66, 67) and after the points of intersection (68, 69) and within the image portion 70 therebetween.

In the management system in the working memory, for each scan line all the points of intersection of the outlines with the auxiliary lines of the scan line are stored together in a sequence according to the scanning direction, a point of intersection where the outline enters the area between the auxiliary lines, and the next point of intersection where the outline leaves the area again, always being treated as a pair. Only the coordinates of the points of intersection in the scanning direction are stored. For each pair of points of intersection a code is also stored which indicates whether both points of intersection are situated on the same auxiliary line. The data blocks relating to the various scan lines are included in the management system successively in the sub-scanning direction, so that finally the data of all the pairs of points of intersection are available in the sequence in which the pixels are exposed on the photoconductive belt. Since the image portions are generally large with respect to the pixels, the number of points of intersection is small compared with the total number of pixels, so that a restricted memory space is sufficient. Implementation of the above-described data processing is well within the knowledge of the skilled artisan and will accordingly not be described further here.

The second part of the procedure relates to assigning a binary value to all the pixels of the area to be processed. In this part, series of pixels are identified to which half bitting can be applied by checking whether these series are at least equal to the half bit pattern, i.e. 2 pixels. For this purpose, the number of whole pixels between the two points of intersection of a pair is counted. If this number is 2 or more, then the outline extends approximately parallel to the scanning direction. In that case, these pixels are filled in in accordance with the half bit pattern. This is carried out by a simple routine which gives the values "black" and "white" alternately to the pixels to be filled in.

If the number of whole pixels between the points of intersection is equal to 0, and if both points of intersection are situated in the same pixel, it is possible that that pixel is intersected by an outline extending approximately parallel to the sub-scanning direction. If, in addition, (1) both points of intersection are situated between ¼ and ¾ of the length of the pixel in the scanning direction, and (2) a pair of points of intersection are also situated between ¼ and ¾ of the pixel length in the pixel at the same position in the previous scan line (this is the neighboring pixel in the sub-scanning direction), then the intended pixel and the neighboring pixel form a sufficiently long series of half bitting in the sub-scanning direction. In that case, the intended pixel is provided with a binary value opposed to that of the neighboring pixel. As a result, the same half bitting pattern of alternate black and white pixels is formed. In all other cases the pixels are provided with a binary value in accordance with a threshold criterion.

A variant of the above-described method of assigning values to the pixels simply assigns to all those pixels within which the outline extends fully in the area between the auxiliary lines, a value in accordance with a half bitting pattern without checking whether at least two contiguous pixels satisfy the criteria. In most cases this gives acceptable, if less elegant, results and requires somewhat less processing time.

The second part of the procedure will now be explained in great detail by reference to the flow diagrams in FIGS. 7A-D. The processing delivers binary values for the pixels for consecutive scan lines and has as its starting point the fact that all the scan lines start and end outside the outlines defined by the image data, so that the first and last pixel of each scan line are white. In the description it is assumed that the scan lines extend vertically upwards. Scan lines follow one another from left to right. To facilitate understanding in this description, the two binary values which can be given to a pixel are termed "white" and "black" respectively according to their effect.

The following description will be given in the form of a computer program. It will, however, be clear that the same data processing can be carried out with specialized hardware circuits or with a combination of hardware and software.

In a first step (100) the binary value "white" is given to all the pixels of the area to be rasterized. As a result, only the black pixels have to be dealt with separately. Processing of the first scan line is then started (101). A variable "current color" is initialized on the value "white". Processing is carried out in each case for a following pair of points of intersection in the scanning direction (102). As already described, a series of contiguous pixels in which the outline extends entirely between the two auxiliary lines is situated between the two points of intersection of a pair. The pixels in which the points of intersection are situated are then calculated in step 103 from the coordinates of the points of intersection, and the pixels which are entirely situated between the two points of intersection are counted. The procedure now branches into a number of different paths for filling in the pixels (if there are any) between the points of intersection and one of the paths is selected according to the result of the count. Each of the paths is also provided with a "filling in routine" for filling in the pixels between the last pixel filled in in the case of the preceding pair of points of intersection and the first pixel filled in at the current pair of points of intersection (this "filling in routine" is described in detail in connection with FIG. 7E).

If the number of whole pixels between the points of intersection is two or more, the half bit pattern can be used to give these pixels (h.b. pixels) a binary value. The bottom-most and the top-most of these pixels are determined (104), the filling in routine is applied to the preceding pixels which have not yet been processed (105 and 106) and then the half bit pattern is filled in (107). The position of the next pixel is kept (108) for the next call up of the filling in routine.

A second path (FIG. 7B) is taken if there are no whole pixels between the points of intersection and both points of intersection are situated in the half bit area of one and the same pixel (120). The "half bit area" denotes that part of the pixel between ¼ and ¾ of the length of the pixel in the scanning direction. This pixel is considered for half bitting in the sub-scanning direction, if it is flanked in the sub-scanning direction by at least one other pixel in which the two points of intersection are also situated in the half bit area, in connection with the required minimum length of a half bit series. A check must therefore be made whether this is the case. This is possible for the preceding scan line, but not for the next scan line, because the pixels thereof have not yet been examined. The first pixel of a half bit series in the sub-scanning direction can therefore only be recognized afterwards.

This problem is solved as follows. Each pixel in which two points of intersection are situated within the half bit area and which is therefore a candidate for filling in with a half bit pattern is stored in a separate memory register and kept for the period of a scan line cycle (step 121). A search is then made in the same memory register to see whether the neighboring pixel in the preceding scan line was also a half bitting candidate (122). If so, then after the filling in routine has been carried out (123 and 124), the pixel is given the inverted value of that neighboring pixel (125). In this way the half bit pattern forms automatically. This path is concluded with keeping the next position for the filling in routine (126). If the neighboring pixel in the preceding scan line was not a half bitting candidate, then the process jumps to the next path.

The third path (FIG. 7C) is taken if there are no whole pixels between the two points of intersection and, in addition, the two points of intersection are not both situated in the half tone area of one and the same pixel. This path is also selected when both points of intersection are situated in the half tone area of one and the same pixel, but the pixel has no neighboring pixel where this is also the case in the preceding scan line. Finally, this path is taken if the number of whole pixels between the points of intersection is exactly equal to 1. This gives insufficient room for placing the half bit pattern in the scanning direction, even if the position of the outline in that one pixel satisfies the half bitting requirement. In this path the average of the positions in the scanning direction of the two points of intersection is calculated and rounded off to the closest pixel boundary (130). The filling in routine is then carried out for the pixels up to that pixel boundary (131 and 132). This processing is equivalent to using a threshold criterion, the pixels in which a point of intersection is situated obtain the value of the image part where they are most situated. Finally, the following position is again kept for the filling in routine (133).

When a pair of points of intersection has been processed in accordance with one of the above described paths, the next pair of points of intersection (if present, step 140, FIG. 7A) is brought up from the memory (141) and in turn processed to binary pixel values. If all the points of intersection of a scan line have been processed in this way, then the next scan line (if present, step 142) is started (143) until all the scan lines have been processed. In this way, the pixel values are delivered in consecutive image lines so that they can be used either directly and substantially synchronously for controlling the laser unit of a printer, or can be efficiently stored in a memory.

Figure 7A:
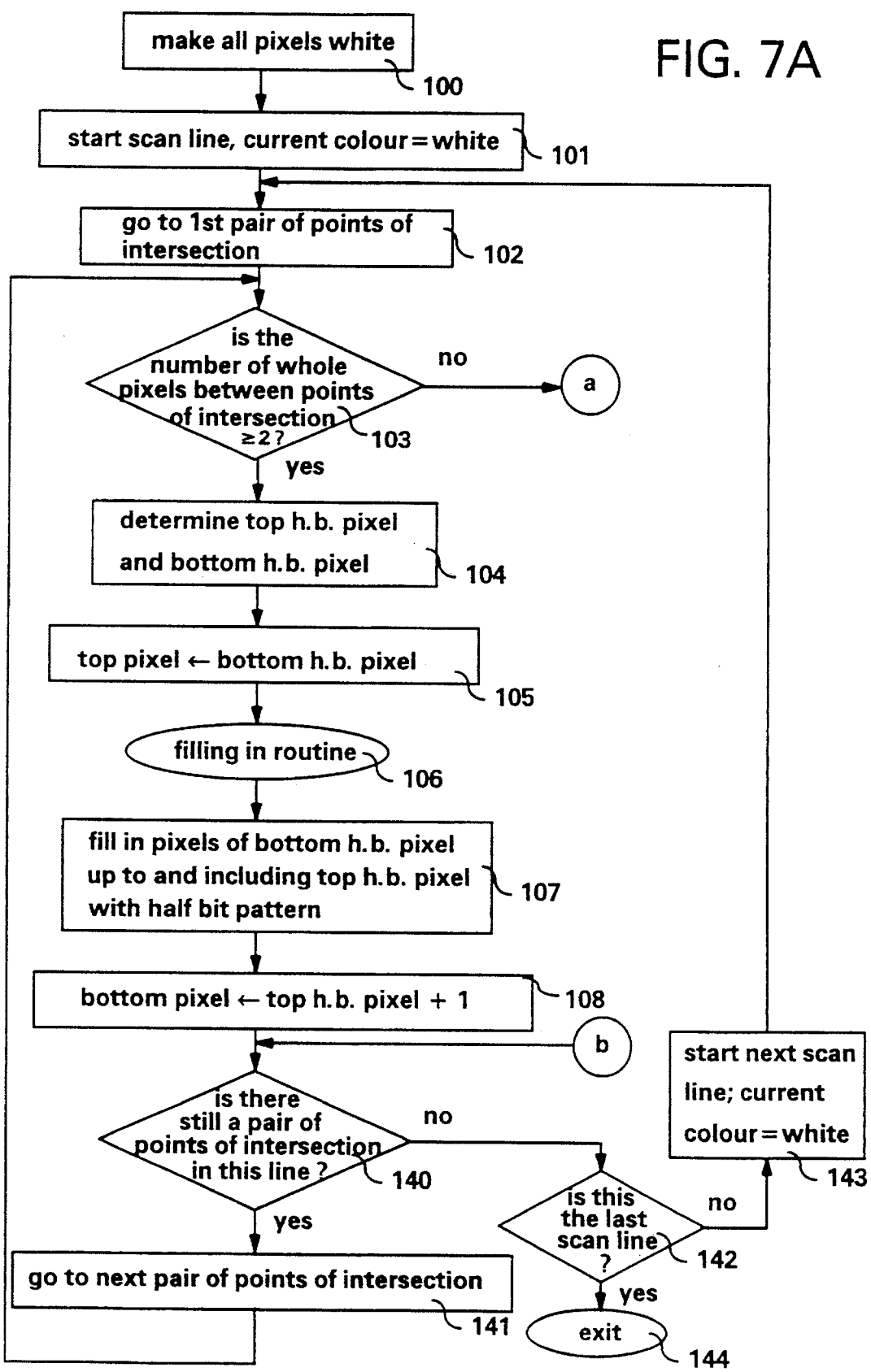
FIGS. 7A–D are flow diagrams of a rasterization procedure according to the present invention.
Figure 7B:
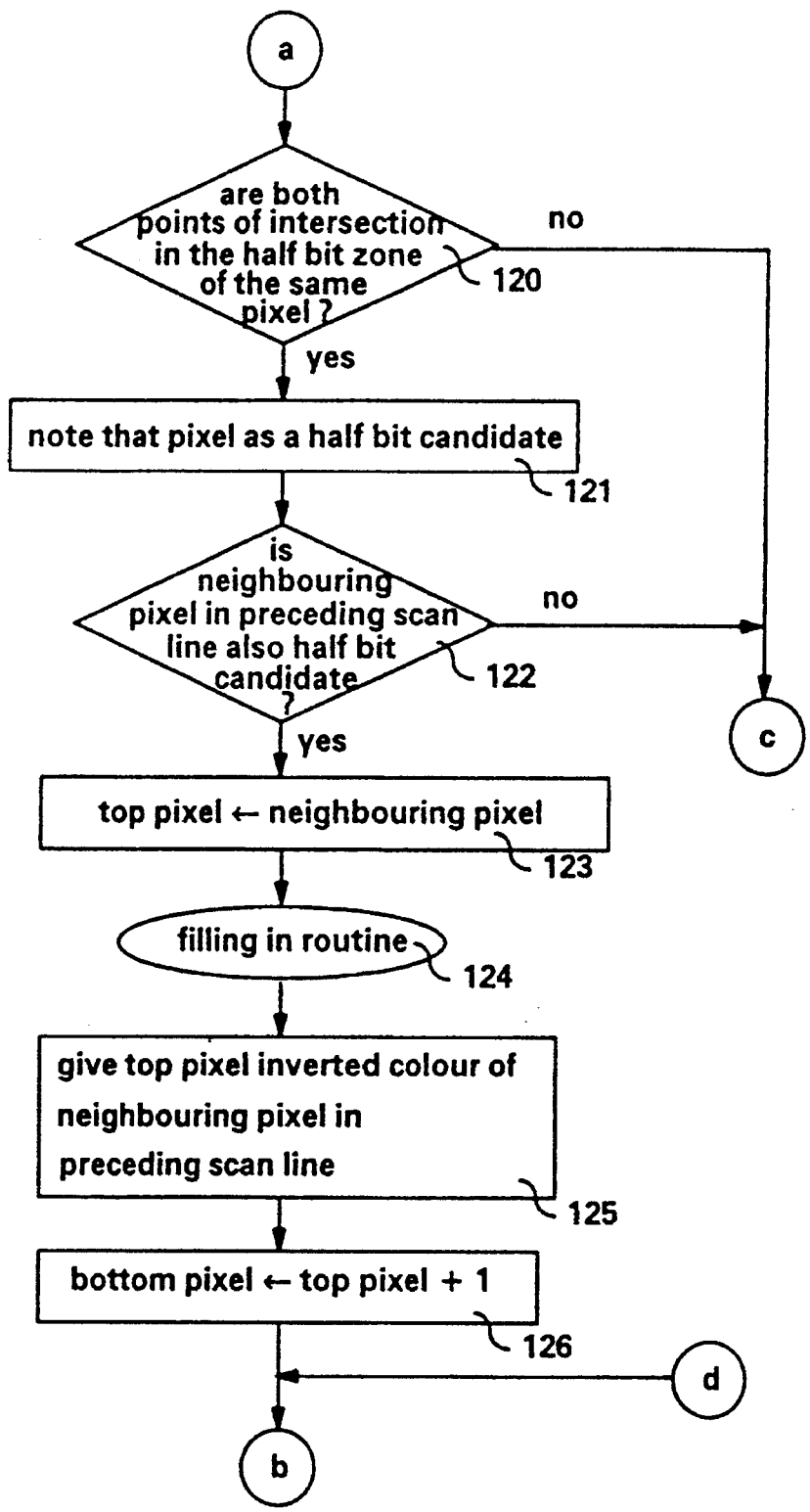
Figure 7C:
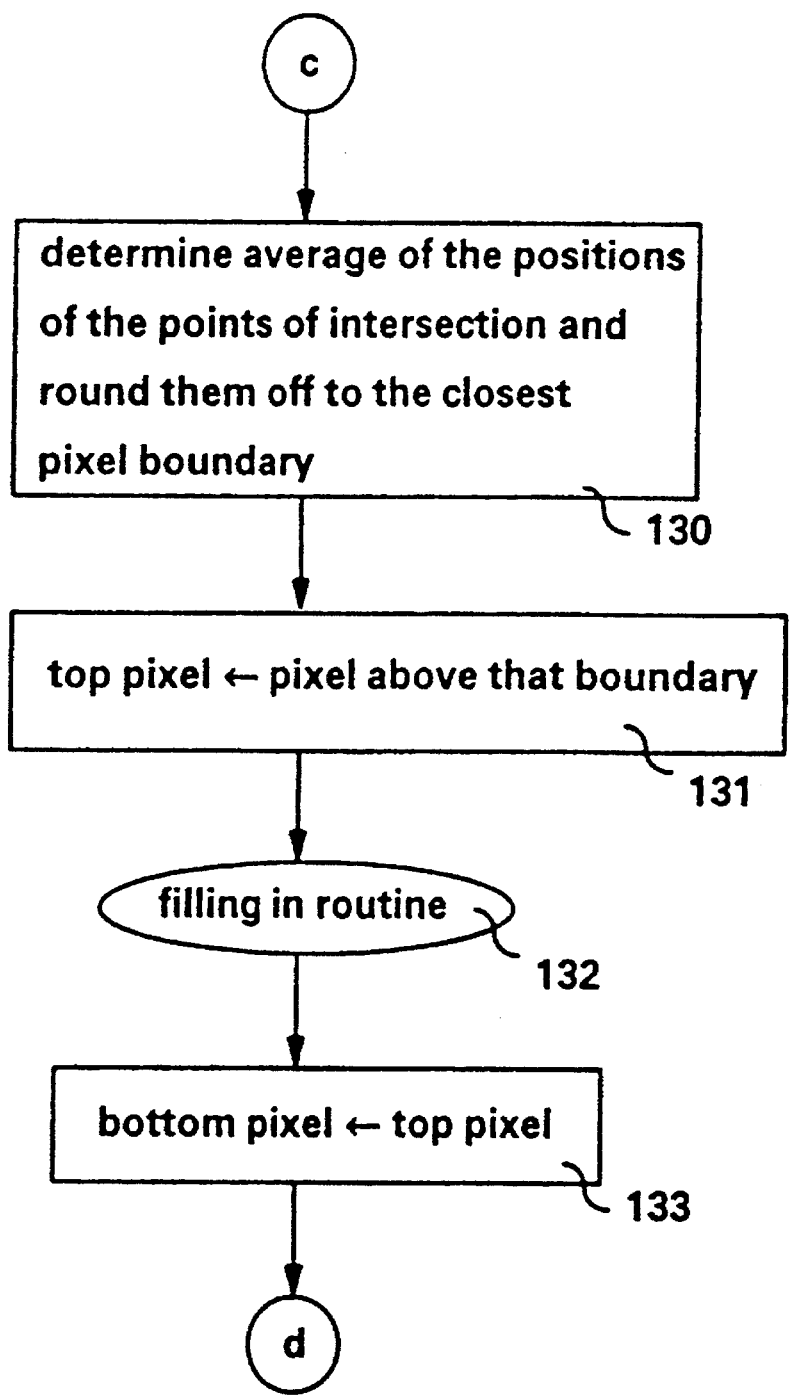
Figure 7D:
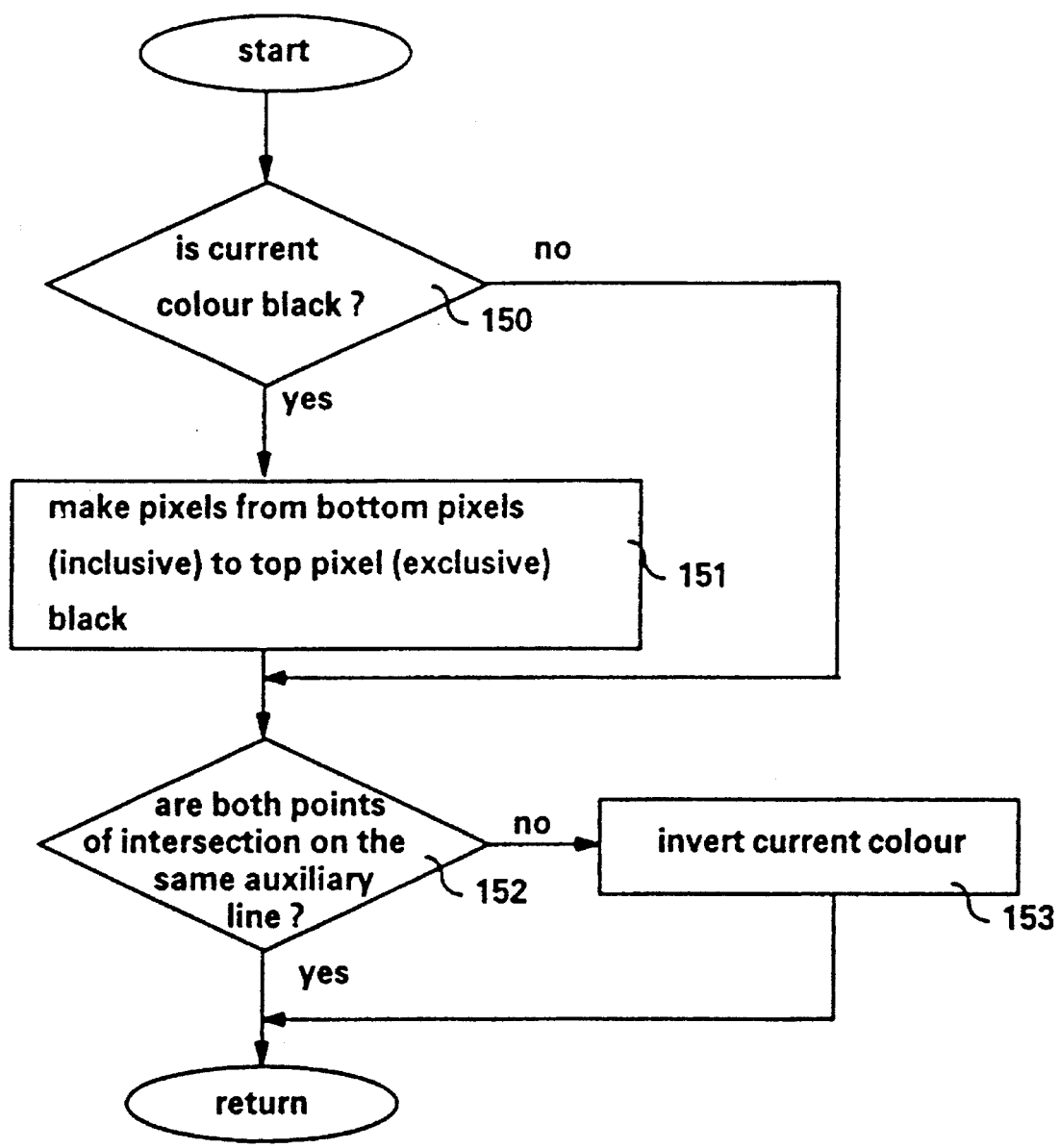

FIG. 7D describes the filling in routine used in all of the above-described paths in order to give a value to the pixels following the pixels filled in at the preceding pair of points of intersection up to a pixel indicated at the call up ("top pixel"). In these conditions it is important whether the first pixel to be filled in ("bottom pixel") coincides with an intersection of the image boundary and the scan line (that is the case if the points of intersection of the preceding pair were situated on different auxiliary lines) or not (if the points of intersection were situated on the same auxiliary line). In the first case, the case of scan line 65 in FIG. 6, the scan line has entered a different image portion in the case of the preceding pair of points of intersection and hence the pixels above the preceding pair of points of intersection must be given the different binary value from the pixels below that pair of points of intersection. It is immaterial whether a half bit pattern is situated between the points of intersection of the pair. In the other case (the case of scan line 61 in FIG. 6), although an image portion has partially overlapped the scan line, it has not done so completely and hence the pixels above the preceding pair of points of intersection must be given the same binary value as the pixels beneath that pair of points of intersection. Here again it is immaterial whether there is a half bit pattern between the points of intersection of the pair.

The routine uses a variable "current color" which may have one of the values "white" or "black". If the value is "black" (step 150 tests for this), the routine gives the value "black" (151) to all the pixels to be filled in, while if the value is "white" the routine leaves the pixels white (of course they were all made white already at the start of the procedure). A search is then carried out in the memory (152) whether the pair of points of intersection processed is situated on the same auxiliary line. Only in the negative case must something be done to ensure that the pixels are given the different value from the current value on the next call up of the routine. This is achieved by giving the variable "current color" the different value (153). That concludes the operation of the filling in routine.

Although the foregoing description relates to a half bit pattern having a period of two pixels, the procedure is suitable, in principle, for other patterns as well. For example, using a pattern having a period of three pixels, as already stated, the boundary line on the print can be positioned with an accuracy of ⅓ pixel. In that case, two half bit areas will be defined within the pixels, e.g. with boundaries 1/6, ½ and 5/6 pixel width. A half bit pattern with 1 black and 2 white pixels is associated with one half bit area and a half bit pattern with 2 black and 1 white pixel with the other half bit area. Three auxiliary lines are now required, equal to the above-mentioned boundaries, but otherwise the procedure does not differ greatly.

The description given above is only one example of an embodiment of the invention. It will be clear to the skilled artisan that other embodiments are possible within the scope of the claims. An alternative to the first part of the procedure as described for assigning binary values to the pixels, using a point of intersection management system, may, for example, imply previously preparing a management system for each scan line on the basis of the outline primitives (line portions) intersected by that scan line or, in the case of a trapezium rasterizer, in respect of the trapezia intersected by the scan line, after which the points of intersection are calculated only during the second part on the actual assignment of binary values to the pixels.

Anyone skilled in the art will have other modifications occur to him based on the teachings of the present invention. These modifications are intended to be encompassed within the scope of this invention.

I claim:

1. An apparatus for rasterizing image data, that is to be supplied to a print engine having an inherent resolution, the apparatus simulating, by an optical integration effect, a print resolution that appears to an observer to be a higher resolution than the inherent resolution, the apparatus comprising:

means for calculating, on the basis of said image data, outlines of image portions of said image data and projecting said outlines on a raster of pixels;

assigning means for assigning a binary value to said pixels in dependence on their position with respect to said outlines, using a half-bitting effect involving half-bit patterns of the same resolution as said raster of pixels;

memory means for storing therein at least one group of data, comprising a half-bit pattern of the same resolution as the raster of pixels, associated with an effective boundary line position with respect to said pixel raster;

identification means for identifying straight series, extending in a major direction of said pixel raster, of contiguous pixels which are intersected by one and the same outline and within which said outline is situated closer to said effective boundary line position associated with said half-bit pattern stored in said memory, than to a pixel edge or any other effective boundary line position, which identification means is connected to said means for assigning a binary value to said pixels in order to give commands;

said assigning means assigning, on command from said identification means, to the pixels of such an identified series, values in accordance with said half-bit pattern associated with said relevant effective boundary line position, and stored in said memory, to form the modified outline bitmap;

the modified outline bitmap enabling the print engine to simulate, by the optical integration effect, a print resolution that appears to an observer to be higher than the inherent resolution.

2. An apparatus according to claim 1, wherein said identification means is provided with means for identifying series, extending in a given major direction of said pixel raster, of contiguous pixels within which an outline extends entirely in a same half bit strip, a half bit strip being a part of a pixel which is bounded by two lines which extend parallel to a given major direction of said pixel raster and intersect the pixel, each half bit strip being associated with a half bit pattern stored in said memory.

3. An apparatus according to claim 2, wherein said identification means is provided with means for determining the length of an identified series and to compare said length to a minimum length stored in said memory in combination with said half bit pattern associated with the relevant half bit strip, and said identification means gives a command, only when said length of such an identified series is at least equal to said minimum length, in order to assign values in accordance with said relevant half bit pattern, to the pixels of said series.

4. An apparatus according to claims 1, 2 or 3, wherein said identification means is provided with means whereby a pixel intersected by an outline is checked as to whether said outline is situated completely within a half bit strip of said pixel and whether the same outline extends entirely in the same half bit strip of at least one adjoining pixel in the direction of said outline, a half bit strip being part of a pixel which is bounded by two lines extending parallel to a given major direction of said pixel raster and intersecting the pixel, each half bit strip being associated with a half bit pattern stored in said memory.

5. An apparatus according to claim 4, wherein said identification means gives a command, in the event that for a given pixel an outline extends completely within a half bit strip of that pixel and the same outline also extends entirely in the same half bit strip of an adjoining pixel in the direction of the outline which has already been given a binary value, to the means for assigning a binary value to the pixels, in order to assign to that given pixel a binary value which, in the relevant half bit pattern, follows on the value of said adjoining pixel.

6. An apparatus according to claim 5, wherein said identification means is provided with means for checking whether the number of adjoining pixels in which said outline extends entirely within the same half bit strip is at least equal to a minimum length stored in said memory in combination with the half bit pattern associated with the relevant half bit strip, and is adapted to give a command for assigning values in accordance with the relevant half bit pattern to said adjoining pixels only in the affirmative case.

7. An apparatus according to claims 2 or 3, wherein a pixel contains exactly one half bit strip in each major direction and the half bit pattern associated with said half bit strip comprises a periodic pattern having a period of two pixels formed by one colored pixel for each two pixels.

8. An apparatus according to claim 4, wherein a pixel contains exactly one half bit strip in each major direction and the half bit pattern associated with said half bit strip comprises a periodic pattern having a period of two pixels formed by one colored pixel for each two pixels.

9. An apparatus according to claims 2 or 3, in which a pixel contains two adjoining half bit strips in each major direction and the half bit patterns associated with said half bit strips comprise periodic patterns having a period of three pixels formed by one or two colored pixels respectively in every three pixels.

10. An apparatus according to claim 4, in which a pixel contains two adjoining half bit strips in each major direction and the half bit patterns associated with said half bit strips comprise periodic patterns having a period of three pixels formed by one or two colored pixels respectively in every three pixels.

11. An apparatus according to claim 4, wherein said identification means is provided with means for checking whether the number of adjoining pixels in which said outline extends entirely within the same half bit strip is at least equal to a minimum length stored in said memory in combination with the half bit pattern associated with the relevant half bit strip, and said identification means gives a command for assigning values in accordance with the relevant half bit pattern to said adjoining pixels only in the affirmative case.

12. An apparatus according to claim 11, wherein a pixel contains exactly one half bit strip in each major direction and the half bit pattern associated with said half bit strip comprises a periodic pattern having a period of two pixels formed by one colored pixel for each two pixels.

13. An apparatus according to claim 11, in which a pixel contains two adjoining half bit strips in each major direction and the half bit patterns associated with said half bit strips comprise periodic patterns having a period of three pixels formed by one or two colored pixels respectively in every three pixels.

14. An apparatus for reproducing digital image data equipped with an apparatus for rasterizing image data as in claim 1.

15. An image processing method of producing a modified outline bitmap for driving a print engine having an inherent resolution, the method enabling the print engine to simulate, by optical integration effect, a print resolution that appears to an observer to be higher than the inherent resolution, the method comprising:

(a) calculating an outline corresponding to a portion of an image;

(b) projecting the outline onto a raster of pixels;

(c) assigning a binary value to each pixel, as a function of the position of the pixel relative to the outline, using a half-bitting effect, the step (c) including:

(c1) identifying substantially straight sequences of contiguous pixels in the outline bitmap;

(c2) designating which of the substantially straight sequences of contiguous pixels should be replaced by a half-bit pattern of the same resolution as the raster of pixels; and (c3) selectively filling, according to step (d), the designated sequences of contiguous pixels with a half-bit pattern of the same resolution as the raster of pixels, to form a modified outline bitmap;

the method producing a modified outline bitmap that enables the print engine to simulate, by the optical integration effect, a print resolution that appears to an observer to be higher than the inherent resolution.

16. A method as in claim 15, further comprising:

storing, prior to step (a), at least one halfbit pattern in a memory to make available the at least one prestored halfbit pattern;

wherein the halfbit pattern of steps (d) and (e) is a prestored halfbit pattern.

17. A method as in claim 15, wherein:

a halfbit pattern is generated from a generating function.

18. A method as in claim 15, further comprising:

printing the modified character outline bitmap using the print engine.

19. A method as in claim 15, wherein:

the image is a text image; and the outline is of an alphanumeric character.

20. A method as in claim 15, wherein:

the raster of pixels has an axis in a major direction;

the substantially straight sequences of contiguous pixels being one of substantially parallel to, and substantially perpendicular with, the major direction.

21. A method as in claim 20, wherein:

a sequence of contiguous pixels has two edge boundary lines;

a halfbit pattern produces the optical integration effect, the optical integration effect being of an effective boundary line located within a sequence of contiguous pixels rather than along either edge boundary line of the sequence; and step (d) comprises:

(d1) determining a location of the outline within a sequence of contiguous pixels;

(d2) determining whether the outline is closer to the location of the effective boundary line of a halfbit pattern than to either of the edge boundary lines or the effective boundary line of another halfbit pattern; and (d3) selecting the sequence of contiguous pixels for replacement with the halfbit pattern when the outline is closer to the location of the effective boundary line.

22. A method as in claim 15, wherein:

a halfbit pattern is periodic over a number of pixels referred to as a pattern number; and in the step (d), it is determined that a particular sequence of contiguous pixels should be replaced by a halfbit pattern if the pattern number of the halfbit pattern is less than a number of pixels in the particular sequence.

23. A method as in claim 20, wherein:

a series of pixels in a direction parallel to the major direction define a scan strip, the scan strip being of a width of a pixel;

the raster includes at least two auxiliary scan lines within each scan strip, the auxiliary scan lines being parallel to the scan strip; and step (d), for a particular sequence of contiguous pixels, comprises:

(d1) determining whether the outline is located between the auxiliary scan lines for a first pixel of the sequence;

the first pixel falling within a range of pixels within the sequence, each pixel of the range possessing the attribute that the outline is located between the auxiliary scan lines thereof;

the range having an alpha end pixel and an omega end pixel, the alpha and omega pixels each being initialized to be the first pixel;

(d2) iteratively determining, in a first direction, an identity of the alpha pixel by examining whether the outline is located between the auxiliary scan lines for an alpha+1 pixel adjoining the alpha pixel, and if so, setting the identity of the alpha pixel to be the adjoining alpha+1 pixel, and if not, the step (d2) terminating;

(d3) iteratively determining, in a second direction opposite to the first direction, an identity of the omega pixel by examining whether the outline is located between the auxiliary scan lines for an omega+1 pixel adjoining the omega pixel, and if so, setting the identity of the omega pixel to be the adjoining omega+1 pixel, and if not, the step (d3) terminating;

(d4) determining whether the auxiliary scan line intersected by the outline in the alpha+1 pixel is the same auxiliary scan line intersected by the outline in the omega+1 pixel; and (d5) identifying the sequence as one that does or does not have the same auxiliary scan line intersected in the alpha+1 pixel and the omega+1 pixel.

24. An image processing apparatus that produces a modified outline bitmap for driving a print engine having an inherent resolution, the apparatus enabling the print engine to simulate, by an optical integration effect, a print resolution that appears to an observer to be higher than the inherent resolution, the method comprising:

outline means for calculating an outline corresponding to a portion of an image;

projecting means, responsive to the outline means, for projecting the outline onto a raster of pixels;

assigning means for assigning a binary value to each pixel as a function of the position of the pixel relative to the outline, using a half-bitting effect the assigning means including:

identifying means, responsive to the projecting means, for identifying substantially straight sequences of contiguous pixels in the outline bitmap;

designation means, responsive to the identifying means, for designating which of the substantially straight sequences of contiguous pixels should be replaced by a half-bit pattern of the same resolution as the raster of pixels; and filling means, responsive to the designation means, for selectively filling the designated sequences of contiguous pixels with a half-bit pattern of the same resolution as the raster of pixels, to form the modified outline bitmap;

the modified outline bitmap enabling the print engine to simulate, by the optical integration effect, a print resolution that appears to an observer to be higher than the inherent resolution.

25. An apparatus as in claim 24, wherein the determination means further comprises:

a memory for storing at least one halfbit pattern, the at least one halfbit pattern being stored prior to operation of the determination means, such that the at least one halfbit pattern is available to the determination means as a prestored halfbit pattern;

wherein the halfbit pattern used by the determination means and the replacement means is a prestored halfbit pattern.

26. An apparatus as in claim 24, wherein:

determination means, for generating any halfbit pattern used by the determination means.

27. An apparatus as in claim 24, further comprising:

a print engine for printing the modified character outline bitmap.

28. An apparatus as in claim 24, wherein:

the image is a text image; and the outline is of an alphanumeric character.

29. An apparatus as in claim 24, wherein:

the raster of pixels has an axis in a major direction;

the substantially straight sequences of contiguous pixels being one of substantially parallel to, and substantially perpendicular with, the major direction.

30. An apparatus as in claim 29, wherein:

a sequence of contiguous pixels has two edge boundary lines;

a halfbit pattern produces the optical integration effect, the optical integration effect being of an effective boundary line located within a sequence of contiguous pixels rather than along either edge boundary line of the sequence; and the determination means comprises:

locator means for determining a location of the outline within a sequence of contiguous pixels;

closeness means, responsive to the locator means, for determining whether the outline is closer to the location of the effective boundary line of a halfbit pattern than to either of the edge boundary lines or the effective boundary line of another halfbit pattern; and selector means, responsive to the closeness means, for selecting the sequence of contiguous pixels for replacement with the halfbit pattern when the outline is closer to the location of the effective boundary line.

31. An apparatus as in claim 24, wherein:

a halfbit pattern is periodic over a number of pixels referred to as a pattern number; and the determination means determines that a particular sequence of contiguous pixels should be replaced by a halfbit pattern if the pattern number of the halfbit pattern is less than a number of pixels in the particular sequence.

32. An apparatus as in claim 24, wherein:

a series of pixels in a direction parallel to the major direction define a scan strip, the scan strip being of a width of a pixel;

the raster includes at least two auxiliary scan lines within each scan strip, the auxiliary scan lines being parallel to the scan strip; and the determination means iteratively operates upon a sequence of contiguous pixels, comprises:

the determination means comprising:

locator means for determining whether the outline is located between the auxiliary scan lines for a first pixel of the sequence;

the first pixel falling within a range of pixels within the sequence, each pixel of the range possessing the attribute that the outline is located between the auxiliary scan lines thereof;

the range having an alpha end pixel and an omega end pixel, the alpha and omega pixels each being initialized to be the first pixel;

alpha identifier means, responsive to the locator means, for iteratively determining, in a first direction, an identity of the alpha pixel by examining whether the outline is located between the auxiliary scan lines for an alpha+1 pixel adjoining the alpha pixel, and if so, setting the identity of the alpha pixel to be the adjoining alpha+1 pixel, and if not, operation of the alpha identifier means terminating;

omega identifier means, responsive to the locator means, for iteratively determining, in a second direction opposite to the first direction, an identity of the omega pixel by examining whether the outline is located between the auxiliary scan lines for an omega+1 pixel adjoining the omega pixel, and if so, setting the identity of the omega pixel to be the adjoining omega+1 pixel, and if not, operation of the omega identifier means terminating;

coincidence means, responsive to the alpha identifier means and the omega identifier means, for determining whether the auxiliary scan line intersected by the outline in the alpha+1 pixel is the same auxiliary scan line intersected by the outline in the omega+1 pixel; and label means, responsive to the coincidence means, for identifying the sequence as one that does or does not have the same auxiliary scan line intersected in the alpha+1 pixel and the omega+1 pixel.

* * * * *